Figure 1:
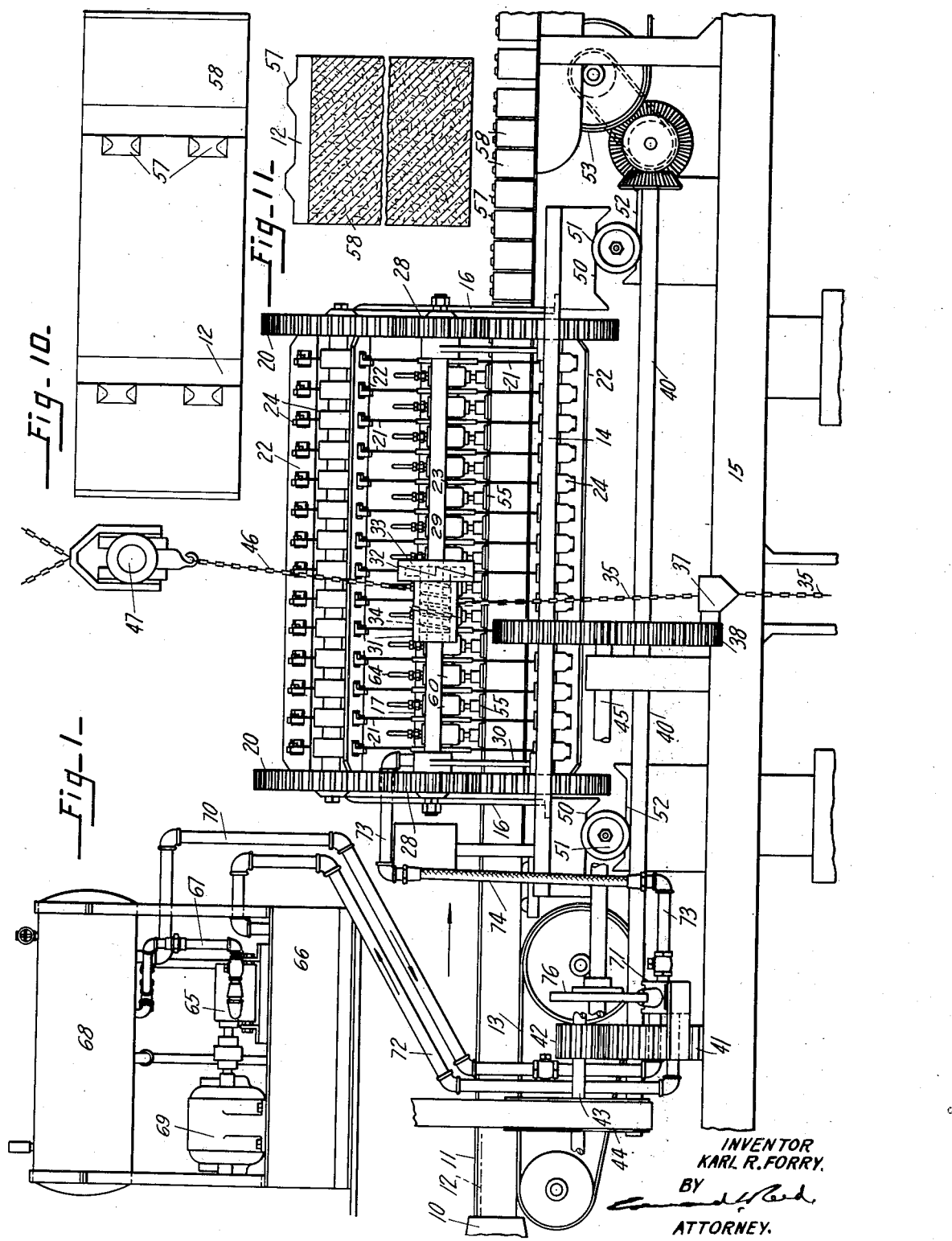

Nov. 20, 1934.  K. R. FORRY  1,981,265
CLAY WORKING MACHINE
Filed Nov. 1, 1933   5 Sheets-Sheet 1

INVENTOR
KARL R. FORRY.
BY
ATTORNEY.

Nov. 20, 1934.　　　　K. R. FORRY　　　　1,981,265
CLAY WORKING MACHINE
Filed Nov. 1, 1933　　　5 Sheets-Sheet 3

INVENTOR
KARL R. FORRY.
BY
ATTORNEY

Nov. 20, 1934.  K. R. FORRY  1,981,265
CLAY WORKING MACHINE
Filed Nov. 1, 1933  5 Sheets-Sheet 4
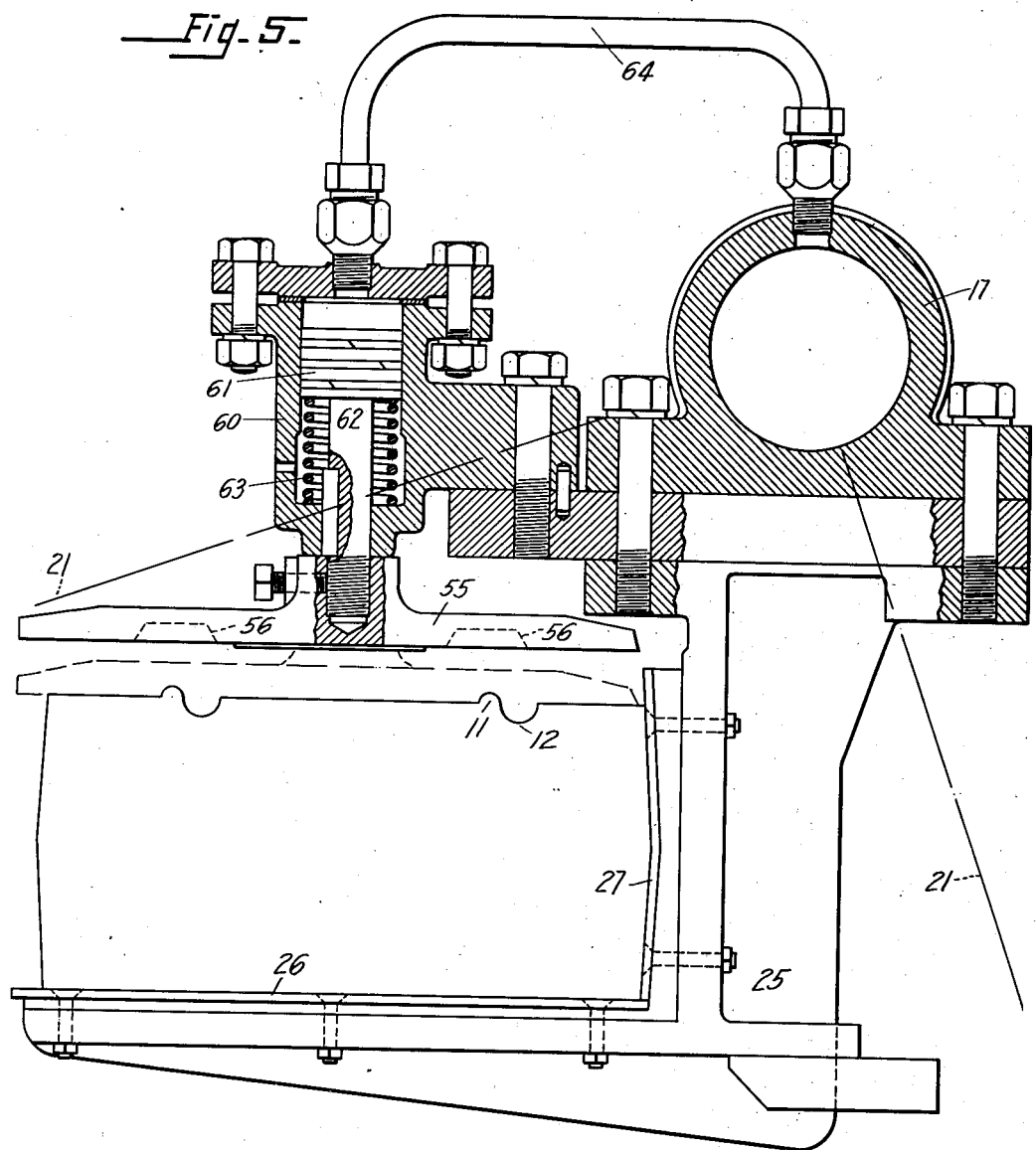
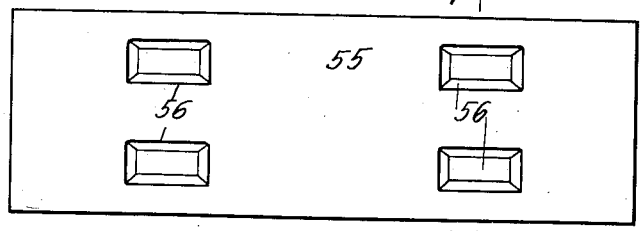
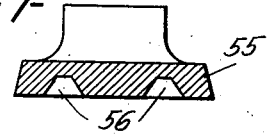
INVENTOR
KARL R. FORRY.
BY
ATTORNEY Patented Nov. 20, 1934

1,981,265

UNITED STATES PATENT OFFICE 1,981,265

CLAY WORKING MACHINE

Karl R. Forry, Newark, Ohio, assignor to The Manufacturers Equipment Company, Dayton, Ohio, a corporation of Ohio Application November 1, 1933, Serial No. 696,172

24 Claims. (Cl. 25—109)

This invention relates to clay working machinery and the like and is designed primarily for use with the cutting mechanism of a brick making machine.

In the manufacture of bricks, and other articles, from clay or similar plastic material it is customary to force the clay through a die which forms the same into a continuous column of the desired cross sectional shape. This clay column passes from the die to cutting mechanism comprising a plurality of cutters to simultaneously sever a portion of the column into a plurality of sections, each of the size and shape of the article to be formed, such as a brick. During the cutting operation the clay column is supported by a plurality of separate supporting devices each adapted to support one section or brick, these supporting devices being spaced apart to permit the passage of the cutters between the same. The supporting devices are of such a character that they support the bottom and that side of the clay column toward which the cutters move but there is no means to cooperate with the cutter along the upper surface of the column and consequently the cutters, which are usually in the form of wires, will often leave the severed sections with uneven or fuzzy upper edges, which is very undesirable particularly in the manufacture of bricks or other articles of a fine quality.

It is therefore one object of my invention to provide a cutting mechanism of this character with means cooperating with the cutters to provide the severed sections with smooth even upper edges.

Further, it is often desirable to provide the brick or other article on one surface with a predetermined contour or configuration. For example, a certain type of paving brick must be provided on one of its lateral surfaces with a plurality of lugs arranged in definite spaced relation one to the other and to the edges of that surface. Usually in a brick making machine of this kind the cross sectional shape of the clay column conforms to the contour of the upper and lower sides of the brick and the top surface of the column forms one of the lateral sides of the brick. Therefore the die which forms the clay column may be so shaped as to provide the upper surface of the column with continuous ribs from which the lugs may be formed but difficulty is experienced in converting these ribs into properly spaced lugs. It has been proposed to accomplish this by means of embossing rolls located between the die and the cutting mechanism but the clay column will slip more or less with relation to the embossing rollers and as a result the lugs will not be accurately spaced on the column and when the latter is severed into sections the lugs will not be properly located on the surface of the brick. It is possible to convert the ribs into lugs after the sections have been severed and discharged from the cutting mechanism but this requires the individual handling of each section or brick and is a slow and expensive operation.

A further object of the invention is to provide means for embossing one surface of the brick, or forming lugs thereon, after the clay column has been properly positioned for the cutting operation and while it is supported by the several supporting devices.

A further object of the invention is to provide an embossing device of such a character that it will also cooperate with the cutters to provide the severed sections with smooth even upper edges.

A further object of the invention is to provide a simple and efficient mechanism for operating the embossing devices in proper timed relation to the operation of the cutting mechanism.

A further object of the invention is to provide embossing devices and actuating mechanism therefor of such a character that they can be embodied in clay working machinery as at present constructed without substantial change therein.

Other objects of the invention will appear as the invention is described in detail.

Figure 2:
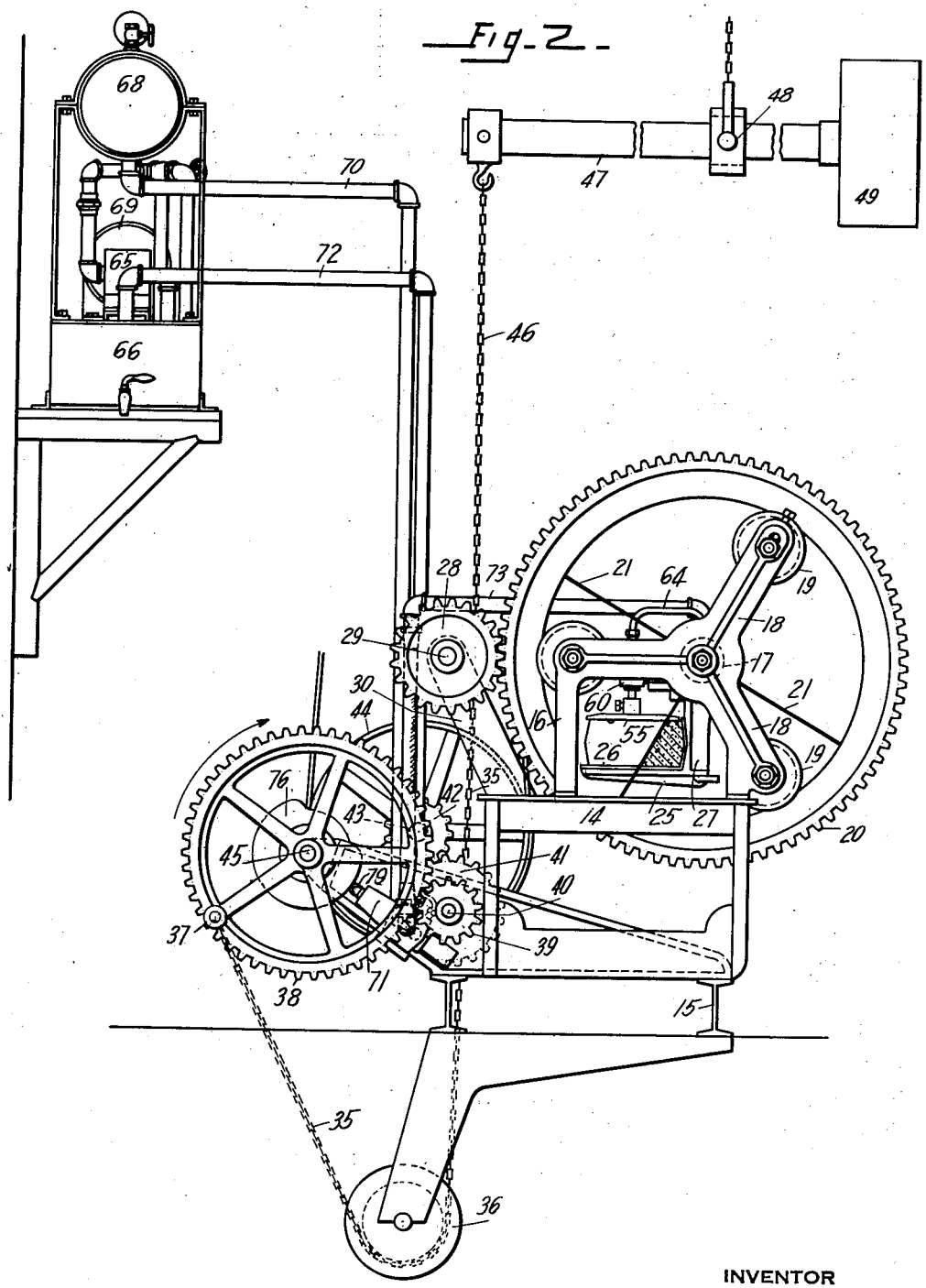
Figure 3:
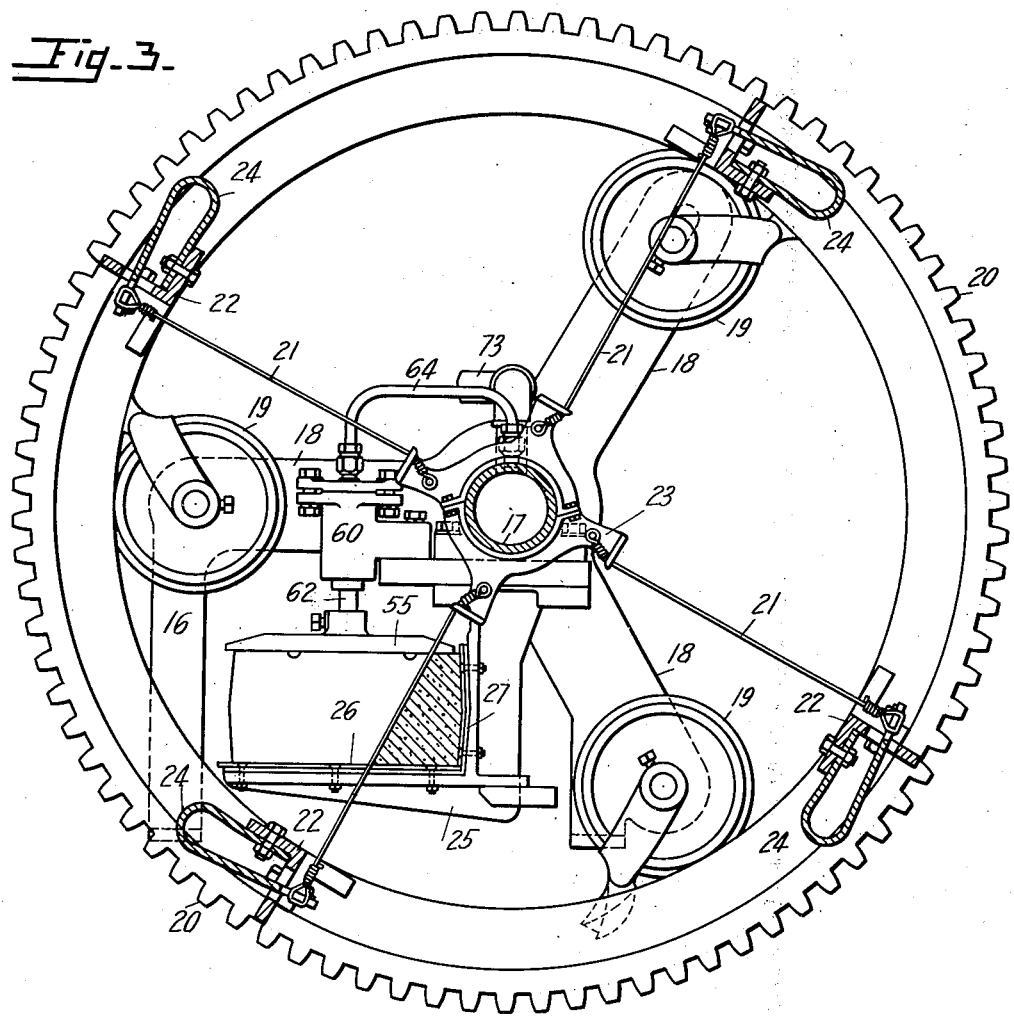
Figure 4:
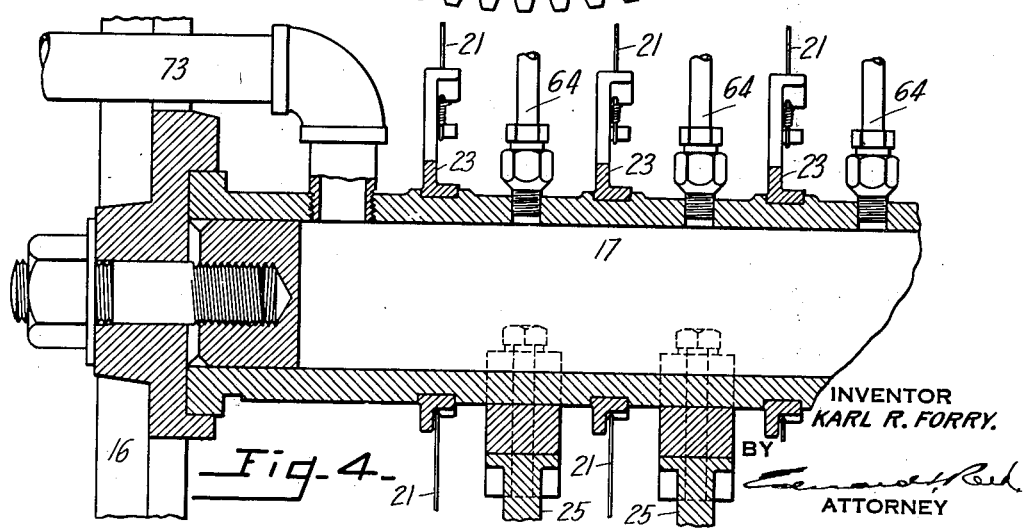
Figure 9:
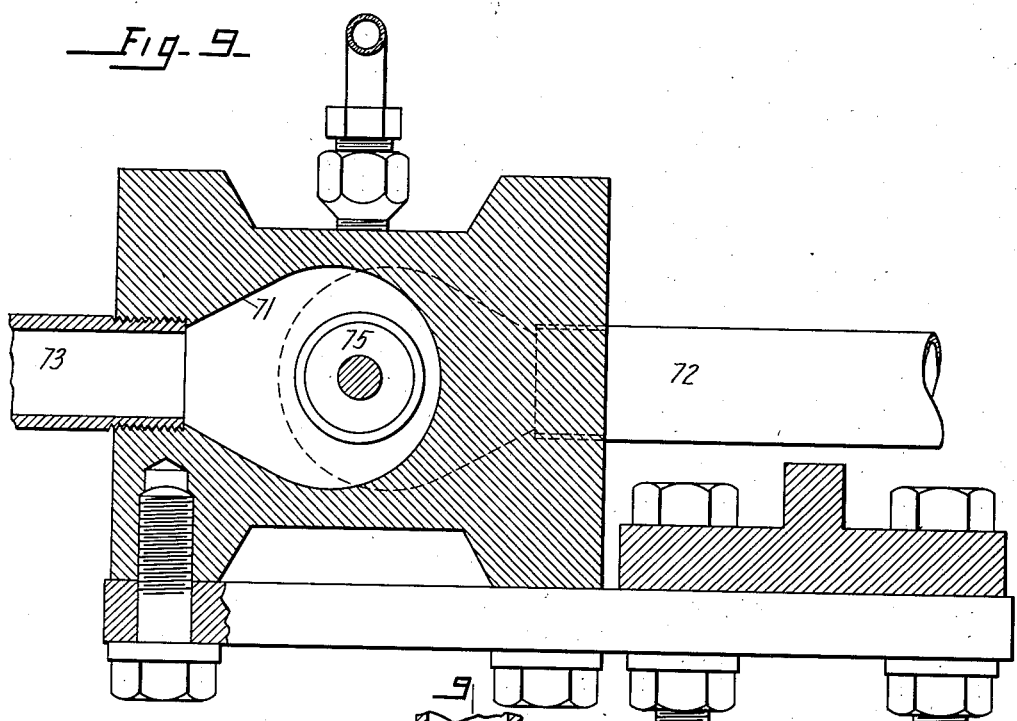
Figure 8:
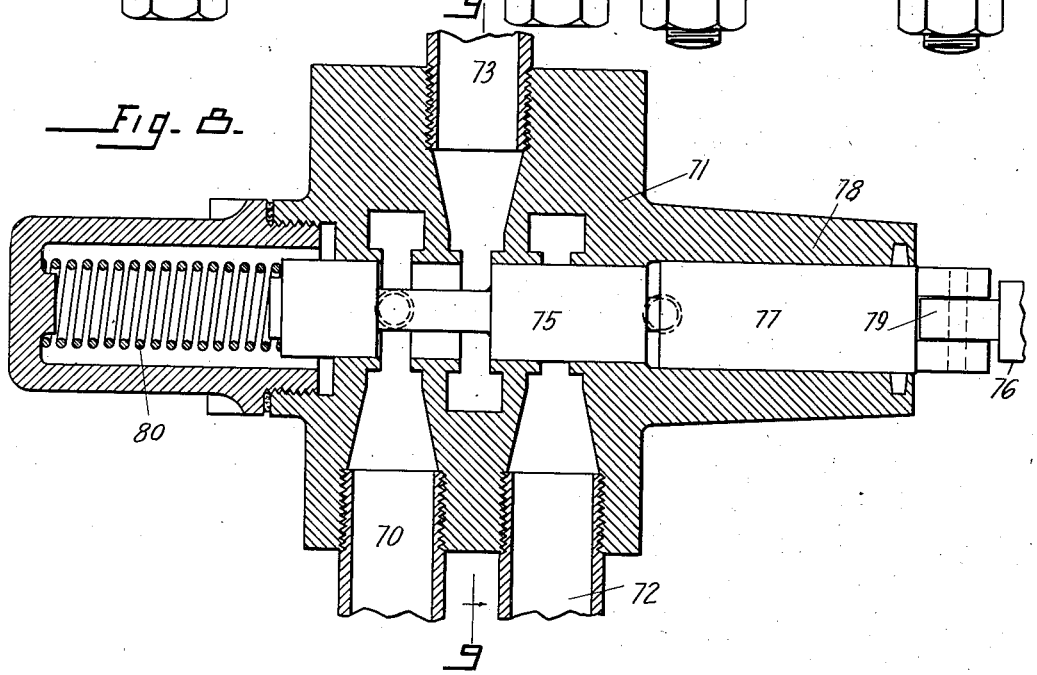

In the accompanying drawings Fig. 1 is a front elevation, partly broken away, of a part of a brick making machine embodying my invention; Fig. 2 is an end elevation of such a machine; Fig. 3 is a transverse sectional view taken through the cutting mechanism, showing the positions of the parts during the cutting operation; Fig. 4 is a sectional detail view of the tubular center structure of the cutting mechanism, which serves as a fluid conduit for the fluid operated actuating devices; Fig. 5 is a detail view, partly in section, of one of the embossing devices and its actuating mechanism, showing the parts in the position which they occupy prior to the cutting operation; Fig. 6 is a bottom plan view of the embossing plate; Fig. 7 is a transverse section taken on the line 7—7 of Fig. 6; Fig. 8 is a longitudinal sectional view of the controlling valve; Fig. 9 is a transverse section taken on the line 9—9 of Fig. 8; Fig. 10 is a side elevation of a severed brick section; and Fig. 11 is a transverse sectional view of the severed section.

In these drawings I have illustrated one embodiment of my invention and have shown the same as applied to a brick making machine of a well known type but it will be understood that this embodiment has been chosen for the purpose of illustration only and that the invention may take various forms and may be used in connection with machines of various kinds for cutting clay or other plastic material into sections.

The particular machine here illustrated is designed primarily for the production of paving bricks and the like and it comprises means, not here shown, for extruding the clay through a die, a portion of which is shown at 10, which die is so shaped as to provide the upper surface of the clay column with two parallel continuous ribs 11, from which lugs may be formed. This die also forms in the upper surface of the clay column continuous grooves 12 arranged parallel with and adjacent to the longitudinal ribs but these grooves are not involved in the present invention. As the clay column leaves the die it is received by a traveling support such as an endless conveyor belt 13, sometimes called a measuring belt, which in turn delivers the column to the cutting mechanism.

The cutting mechanism as a whole is mounted on a supplemental base 14 which in turn is mounted on a main base 15 forming part of the main frame. Rigidly mounted on the supplemental base 14 are upright frame members 16 spaced some distance apart and rigidly connected one to the other by a center structure 17, here shown as a tubular member. The end frames 16 each comprise a plurality of arms 18 radiating from the tubular center member 17 and provided at their outer ends with rollers 19. Mounted for rotation about the center member 17 is a reel which carries the cutters and which comprises two gears 20 having external teeth and an internal track which travels on the rollers 19, thus permitting the reel to rotate about and with relation to the center member 17 and the frame members. This reel is provided with four series of cutters each series comprising a plurality of wires 21 arranged substantially radially of the reel and spaced apart distances equal to the width of the severed sections. These wires are connected at their outer end with tie bars 22 which extend between and rigidly connect the gears 20. The wires are connected at their inner ends with members or brackets 23 mounted for rotation about the tubular structure 17. The brackets 23 correspond in number to the number of wires in each series and the corresponding wires of the four series are connected with the same bracket, thus supporting these corresponding wires for rotation in a common path. In order that the wires may be maintained taut they are connected with the tie bars 20 by means of relatively stiff springs 24. This reel is rotated intermittently, each rotatory movement being ninety degrees in extent.

The clay column is supported in the paths of the wire cutters by a plurality of supporting devices each of which comprises a bracket 25 rigidly secured to and depending from the center structure 17 and having a bottom plate 26 and a back plate 27, these plates being of a width substantially equal to the width of the sections which are to be severed from the clay column. The several supporting devices are spaced apart distances sufficient to permit the passage of the cutting wires 21 between the same. The several supporting devices are arranged in line so that the clay column, as it moves from the measuring belt 13, will be delivered to and supported by these supporting devices in the paths of the cutting wires. Upon each quarter rotation of the reel one series of cutting wires will pass through the clay column and divide the same into sections and during the interval between the successive rotations of the reel another portion of the clay column is properly positioned on the supporting devices in the paths of the cutting wires.

Rotatory movement is imparted to the reel by pinions 28 meshing with the respective gears 20 and mounted on a shaft 29 which is journaled in bearings carried by standards 30 extending upwardly from the supplemental frame 14. A drum 31 is mounted on this shaft for rotatory movement with relation thereto and is provided at one end with a clutch member 32 which cooperates with a second clutch member 33 mounted on the shaft and held against rotation with relation thereto. The drum 31 and its clutch member 32 are mounted for axial movement on the shaft 29 and are pressed toward the clutch member 33 by a spring 34 arranged within the drum. Wound about the drum and connected therewith is a chain 35 which extends downwardly about a guide sheave 36 and thence upwardly and is connected with a crank pin 37 on a driving gear 38, which gear is mounted on a shaft 45. This driving gear is rotated by a pinion 39 carried by a shaft 40 which is connected by gears 41 and 42 with a shaft 43 which is provided with a belt pulley 44 by means of which it may be connected with a suitable source of power. The parts are so arranged that at the end of each quarter rotation of the reel the crank pin 37 will be at or near its lowermost position and the chain 35 will be wound about the drum 31 and the clutch member 32 carried by that drum will be in engagement with the clutch member 33. The gear 38 rotates in the direction of the arrow in Fig. 2 and the upward movement of the crank pin will unwind the chain from the drum 31, thereby imparting rotation to the drum which, through the two clutch members, will impart rotation to the pinions 28 and to the gears 20 of the reel. The gear ratio is such that a half rotation of the gear 38 will impart a quarter rotation to the gears 20. Connected with the drum 31 is a second chain 46 which extends upward therefrom and is connected at one end with a pivoted lever 47 mounted on a suspended fulcrum 48 and having at its other end a counterweight 49. As the chain 35 is unwound from the drum the chain 46 will be wound thereon and the counterweight elevated. When the driving gear 38 has completed a half rotation and the crank pin moves downwardly the chain 35 will be slacked off and the counterweight will unwind the chain 46 from the drum and thus rotate the drum in a reverse direction which will cause the clutch member 32 to ride over the teeth of the clutch member 33 without imparting rotation to the shaft 29. Consequently on each cycle of operations the cutter reel is moved through a quarter rotation and then held against rotation until the parts have been returned to their initial positions.

The clay column moves continuously during the cutting operation and in order that the cuts may be at right angles to the length of the column the cutting mechanism is caused to move forwardly at the same speed that the clay column is moving, during the cutting operation. For this purpose the supplemental frame 14 is provided with downwardly facing tracks 50 which rest upon rollers 51 carried by upwardly facing tracks 52 carried by the main base 15, the arrangement being such as to permit a reciprocatory movement of the cutting mechanism. This reciprocatory movement may be imparted to the cutting mechanism in the usual or any suitable manner but inasmuch as the mechanism for reciprocating the cutting mechanism is not involved in the present invention it is not here illustrated. Suffice it to say that the reciprocatory movements of the cutting mechanism are so timed that said mechanism will be moved forwardly simultaneously with and during each quarter rotation of the reel and at the end of each quarter rotation, and while the reel is held against rotation, the mechanism will be moved rearwardly to its initial position. As has been explained each quarter rotation severs from the clay column a plurality of brick sections and after the cutting wires have moved out of engagement with the clay column the continued movement of the latter will move the severed sections beyond the cutting mechanism and onto a conveyor 53 which carries them to the point of discharge and which is operated at a slightly greater speed than the speed at which the clay column moves so as to separate the sections one from the other and thus facilitate their removal from the conveyor. During the reciprocatory movement of the cutting mechanism the clay column will advance such a distance that when the cutting mechanism is returned to its initial or rearmost position another portion of the clay column will be properly positioned on the supporting devices for severance into sections.

The mechanism so far described is of a well known type and forms no part of the present invention except in so far as it enters in combination with the novel features which will now be described.

For the purpose of imparting the desired configuration to the upper surface of each section which is severed from the clay column, that is, in the present instance, converting the continuous ribs into short lugs, I have mounted above each individual supporting device 25 an embossing device 55 which, as here shown, comprises a pressure plate having in its lower surface two pairs of recesses, each pair of recesses being arranged above and spaced apart lengthwise of one of the ribs on the clay column. These recesses are so arranged with relation one to the other that those portions of the pressure plate between and on the outer sides of the recesses will press the adjacent portions of the rib down flush with the upper surface of the column, and those portions of the rib which project into the recesses will be shaped to form the lugs 57 on the upper surface of the severed section 58, as shown in Figs. 10 and 11. Preferably the pressure plates 55 are of a width equal to the width of the severed section and the edges of adjacent pressure plates are spaced apart a distance substantially equal to the thickness of the cutting wires 21, so that they will cooperate with those wires to produce a clean cut which will leave the upper edges of the severed sections substantially smooth and even.

In order to avoid interfering with the movements of the cutting wires each pressure device is provided with a separate actuating device mounted in a fixed position between the paths of adjacent cutting wires. These actuating devices may be of any suitable character which will permit the same to be operated in properly timed relation to the movements of the cutting mechanism and any suitable means may be provided for causing the several actuating devices to operate in unison and at the proper time with relation to the movements of the cutting mechanism.

The embossing operation may be performed at any time while that section of the clay column which is to be embossed is supported on its individual supporting device, but I prefer that the embossing device shall be caused to engage the clay column before the cutting wires engage the column. This is particularly important when the pressure plate is designed to cooperate with the cutters to provide a smooth cut between the sections. Thus by moving the pressure plate into engagement with the clay column during the first portion of the movement of the cutters and before they have engaged the clay column the pressure plate is in a position to cooperate with the cutting wires during the entire severing operation and they are held firmly in engagement with the clay column during that severing operation.

In the present apparatus I have employed fluid operated devices for actuating the pressure devices and have utilized the tubular center structure 17 as a supply conduit for these fluid operated devices. As shown in the drawings each actuating device comprises a cylinder 60 which is rigidly secured to the tubular member 17. Mounted in this cylinder is a piston 61 which is connected by a piston rod 62 with the pressure device 55. A spring 63 acts on the piston to hold the same and the pressure device normally in their elevated positions, in which position the pressure device is spaced above the path of the clay column. Each cylinder 60 is connected by a conduit 64 with the interior of the tubular structure or center column 17. This tubular structure is connected with a suitable source of supply for fluid under pressure and, in the present construction, this source of supply comprises a pump 65 mounted on and having its intake connected with an oil reservoir 66 and having its outlet connected by a conduit 67 with an equalizing chamber 68. A motor 69 operates the pump continuously when the machine is in operation. The equalizing chamber 68 is connected by a pressure conduit 70 with a valve casing 71 and the supply reservoir 66 is connected with the valve casing by a return conduit 72. The valve casing is connected with the tubular center member 17 by a conduit 73 having a flexible portion 74 to permit of the reciprocatory movement of the feeding mechanism. Mounted within the valve casing 71 is a valve member adapted to alternately connect the conduit 73 with the conduits 70 and 72. In the present instance a double piston valve 75 is slidably mounted in the valve casing and its position is controlled by a cam 76 which is preferably mounted on the shaft 45 of the driving gear 38 so that the cam will occupy a definite fixed relation to the driving gear. A plunger 77 is slidably mounted in an extension 78 of the valve casing and arranged to actuate the valve member 75. The outer end of this plunger extends beyond the extension 78 and is provided with a roller 79 to engage the cam 76. When the plunger is moved inwardly by the cam the valve member is moved to the position shown in Fig. 8 and thus connects the pump discharge with the supply conduit in the tubular structure 17, which conduit is in open communication with the cylinders of the several actuating devices. When the plunger is released by the cam a spring 80 moves the valve member in the opposite direction and interrupts the connection between the conduit 73 and the conduit 70 and establishes a connection between the conduit 73 and the conduit 72, thus permitting the fluid to flow back to the supply reservoir 66 when the pistons of the actuating devices are elevated by the springs. The cam 76 is so shaped that it will actuate the valve during the first portion of the upward movement of the crank pin 37 on the driving gear 38, that is, during the initial rotary movement of the cutting mechanism. The valves will be held open until the crank pin has reached the upper limit of its movement and the cutting operation has been completed, at which time the valve will be released by the cam and will be moved by the spring to interrupt the pressure and provide for the exhaust of the fluid from the cylinders.

The operation of the mechanism will be readily understood from the foregoing description and it will be apparent that when the forward portion of the continuously moving clay column has been located upon the several individual supporting devices the cutting mechanism will be automatically operated to impart a quarter rotation to the cutters and to simultaneously move the cutters forwardly with the clay column. During the first portion of this movement the controlling valve for the fluid operated actuating devices will be opened and the fluid will act almost instantly on the pressure devices and will cause the same to be moved into engagement with the respective sections of the clay column before the cutters have advanced far enough to engage the column. The further movement of the cutters will carry the same through the clay column thus dividing the same into sections. After the cutters have passed beyond the column and their rotatory movement has been interrupted the controlling valve will be reversed to release the pressure devices and these will be instantly elevated by the action of the springs on the pistons of the actuating devices. At the same time the longitudinal movement of the cutting mechanism is reversed and it travels rearwardly to its initial position and by the time it reaches that position the clay column will have moved forward far enough to again position the forward portion thereof on the supporting devices and the same cycle of operations is repeated.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a machine comprising cutting mechanism for severing a column of plastic material into sections, a device to support the section to be severed during the severing operation, and means for actuating said cutting mechanism; an embossing device arranged to act on said section while it is supported in severing position by said supporting device, and means for actuating said embossing device in timed relation to the operations of said cutting mechanism.

2. In a machine comprising cutting mechanism for severing a column of plastic material into sections, a device to support the section to be severed during the severing operation, and means for actuating said cutting mechanism; an embossing device arranged to act on said section while it is supported in severing position by said supporting device, and means for causing said embossing device to act on said section before said column has been engaged by said cutting mechanism.

3. In a machine comprising cutting mechanism for severing a column of plastic material into sections, a device to support the section to be severed during the severing operation, and means for actuating said cutting mechanism; a device mounted for movement into engagement with the upper surface of said section while the latter is on said supporting device and having an edge parallel with and closely adjacent to the line of severance between said section and an adjacent portion of said column, and means for moving said movable device into engagement with said section prior to the severing operation.

4. In a machine comprising mechanism having a plurality of cutting wires to simultaneously sever a column of plastic material into sections, means to separately support each section during the cutting operation, and means to actuate said cutting wires; pressure devices mounted above the respective sections and having their front and rear edges parallel with the lines of severance, said pressure devices having their adjacent edges spaced apart a distance substantially equal to the thickness of said wires, and means for moving said pressure devices into engagement with the respective sections prior to the severing operation.

5. In a machine comprising a plurality of separate supporting devices arranged in line to receive and support a column of plastic material, a cutting device having a plurality of cutters mounted for movement between adjacent supporting devices to sever said column into sections, and means for actuating said cutting devices; a pressure device mounted above each supporting device and movable into engagement with that portion of said column which is supported on that supporting device, actuating mechanism common to the several pressure devices, and means for operating said actuating mechanism in timed relation to the movements of said cutting device.

6. In a machine comprising a plurality of separate supporting devices arranged in line to receive and support a column of plastic material, a cutting device having a plurality of cutters mounted for movement between adjacent supporting devices to sever said column into sections, and means for actuating said cutting device; a pressure device mounted above each supporting device and movable into engagement with that portion of said column which is supported on that supporting device, and means for simultaneously actuating said pressure devices.

7. In a machine comprising a plurality of separate supporting devices arranged in line to receive and support a column of plastic material, a cutting device having a plurality of cutters mounted for movement between adjacent supporting devices to sever said column into sections, and means for actuating said cutting devices; a pressure device mounted above each supporting device and movable into engagement with that portion of said column which is supported on that supporting device, and means for causing said pressure devices to engage the respective portions of said column prior to the severing operation.

8. In a machine comprising a plurality of separate supporting devices arranged in line to receive and support a column of plastic material, a cutting device having a plurality of cutters mounted for movement between adjacent supporting devices to sever said column into sections, and means for actuating said cutting devices; a pressure device mounted above each supporting device and movable into engagement with that portion of said column which is supported on that supporting device, a separate actuating device for each pressure device, and means for simultaneously operating said actuating devices.

9. In a machine comprising a plurality of separate supporting devices arranged in line to receive and support a column of plastic material, a cutting device having a plurality of cutters mounted for movement between adjacent supporting devices to sever said column into sections, and means for actuating said cutting devices; a pressure device mounted above each supporting device and movable into engagement with that portion of said column which is supported on that supporting device, a separate actuating device for each pressure device, and a single device to control the operation of said actuating devices.

10. In a machine comprising a plurality of separate supporting devices arranged in line to receive and support a column of plastic material, and means for severing those portions of said column which are supported on the respective supporting devices one from the other; means for imparting a predetermined configuration to one surface of each of said portions while it is supported on its supporting device.

11. In a machine comprising a plurality of separate supporting devices arranged in line to receive and support a column of plastic material, and means for severing those portions of said column which are supported on the respective supporting devices one from the other; an embossing device mounted above each supporting device and movable into engagement with the material thereon, separate means for actuating each embossing device, and means for causing said actuating means to move said embossing devices into engagement with said column prior to said severing operation.

12. In a machine comprising a plurality of separate supporting devices arranged in line to receive and support a column of plastic material, and means for severing those portions of said column which are supported on the respective supporting devices one from the other; an embossing device mounted above each supporting device and movable into engagement with the material thereon, a fluid pressure operated device for actuating each embossing device, and means operating in timed relation to the severing operation to admit fluid under pressure to said actuating devices.

13. In a machine comprising a plurality of separate supporting devices arranged in line to receive and support a column of plastic material, and means for severing those portions of said column which are supported on the respective supporting devices one from the other; an embossing device mounted above each supporting device and movable into engagement with the material thereon, a fluid pressure operated device for actuating each embossing device, and a single device controlled by a part of said machine to admit fluid under pressure to all of said actuating devices.

14. In a machine comprising a plurality of separate supporting devices arranged in line to receive and support a column of plastic material, and means for severing those portions of said column which are supported on the respective supporting devices one from the other; a device mounted above each supporting device for movement into engagement with said column and cooperating with said severing means to sharply define the line of severance, and means for actuating said devices prior to the severing operation.

15. In a machine comprising a plurality of separate supporting devices arranged in line to receive and support a column of plastic material, and means for severing those portions of said column which are supported on the respective supporting devices one from the other; a device mounted above each supporting device for movement into engagement with said column and cooperating with said severing means to sharply define the line of severance, a fluid pressure operated device for actuating each of said devices, and means for admitting fluid under pressure simultaneously to all of said pressure operated devices.

16. In a machine for severing a column of plastic material into sections and comprising a center structure, a plurality of supporting devices mounted on said structure and arranged to receive and support said column of material, a series of cutters rotatable about said center structure and arranged to pass between adjacent supporting devices, and means for actuating said cutters; pressure devices mounted above the respective supporting devices for movement into engagement with said column of material, separate actuating devices for said pressure devices mounted on said center structure, and means to operate said actuating devices in timed relation to the movement of said cutters.

17. In a machine for severing a column of plastic material into sections and comprising a tubular center structure, a plurality of supporting devices mounted on said structure and arranged to receive and support said column of material, a series of cutters rotatable about said center structure and arranged to pass between adjacent supporting devices, and means for actuating said cutters; pressure devices mounted above the respective supporting devices for movement into engagement with said column of material, fluid pressure operated devices mounted on said center structure and operatively connected with the respective pressure devices, means including a valve for connecting said tubular center structure with a source of supply of fluid under pressure, conduits connecting said tubular center structure with the respective fluid operated devices, and means for actuating said valve.

18. In a machine for severing a column of plastic material into sections, and comprising a tubular center structure, a plurality of supporting devices mounted on said structure and arranged to receive and support said column of material, a series of cutters rotatable about said center structure and arranged to pass between adjacent supporting devices, and means for actuating said cutters; pressure devices mounted above the respective supporting devices for movement into engagement with said column of material, fluid pressure operated devices mounted on said center structure and operatively connected with the respective pressure devices, means including a pump to deliver fluid under pressure to said tubular center structure, a valve casing, a conduit connecting said valve casing with said tubular structure, separate conduits connecting said valve casing with the inlet and outlet sides of said pump respectively, a valve member mounted in said casing to connect the last mentioned conduits alternately with the conduit leading to said tubular structure, cam means for actuating said valve member, and separate conduits connecting said tubular structure with the respective fluid pressure operated devices.

19. In a brick making machine comprising means for forming a clay column having longitudinal ribs on its upper surface, a plurality of cutters to sever said column into brick size sections, a plurality of supporting devices to receive said column and support the same during the cutting operation, and means for actuating said cutters; an embossing device mounted above each supporting device for movement into engagement with said column, said embossing device having its lower surface shaped to convert the ribs on said column into short lugs of predetermined shape, separate means for actuating said embossing devices, and means to control the operation of the last mentioned actuating means in accordance with the movements of said cutters.

20. In a machine for severing a column of plastic material into sections comprising a cutter and means to support the section to be severed during the severing operation; a device mounted adjacent to said supporting means for movement into engagement with the section of material which is in severing position thereon, and means controlled in accordance with the movement of said cutter to press said device into engagement with the material on said supporting means.

21. In a machine for severing a column of plastic material into sections, comprising a plurality of cutters, and means to support a portion of said column of material in a stationary position while said cutters act thereon to sever the same into sections; a plurality of devices mounted adjacent to said supporting means for movement into engagement with the respective sections of material which are in severing position thereon, and means controlled in accordance with the movement of said cutters to cause said devices to engage the respective sections while they are stationary on said supporting means.

22. In a machine for severing a column of plastic material into sections, comprising a plurality of cutters, and means to support a portion of said column of material in a stationary position while said cutters act thereon to sever the same into sections; a plurality of devices mounted adjacent to said supporting means for movement into engagement with the respective sections of material which are in severing position thereon, and means controlled in accordance with the movement of said cutters to cause said devices to engage the respective sections while they are stationary on said supporting means and before they have been severed one from the other.

23. In a machine for severing a column of plastic material into sections comprising a plurality of cutters, and means to support a portion of said column of material while said cutters act thereon to sever the same into sections; means arranged adjacent to said supporting means to act on the material thereon to impart a predetermined configuration to one face of each section thereof, and means having parts arranged between the paths of adjacent cutters to cause the last mentioned means to act on said material while it is on said supporting means.

24. In a machine for severing a column of plastic material into sections comprising a plurality of cutters, and means to support a portion of said column of material while said cutters act thereon to sever the same into sections; means controlled in accordance with the movement of said cutters to impart a predetermined configuration to one face of each section of material on said supporting means before said sections are severed one from the other.

KARL R. FORRY.